United States Patent

[11] 3,601,690

[72] Inventors James F. Judson
Rochester;
Eugene A. Peterson, Penfield, both of, N.Y.
[21] Appl. No. 11,713
[22] Filed Feb. 16, 1970
[45] Patented Aug. 24, 1971
[73] Assignee General Dynamics Corporation

[54] MULTICOUPLER EMPLOYING A MULTIPLE FILAR-WOUND TRANSFORMER

9 Claims, 5 Drawing Figs.

[52] U.S. Cl. .......... 323/48, 307/17, 307/32, 323/60
[51] Int. Cl. .......... H02j 3/00
[50] Field of Search .......... 323/6, 48, 49, 60; 307/17, 32

[56] References Cited

FOREIGN PATENTS 1,134,455 8/1962 Germany .......... 307/17

*Primary Examiner*—Gerald Goldberg
*Attorney*—Martin Lu Kacher

ABSTRACT: A multicoupler is described which employs a multiple bifilar-wound transformer with outputs therefrom feeding each of the multiplicity of loads. The transformer has a multiplicity of adjacent in series pairs of windings which are serially connected. The ungrounded terminal of an input source is connected in common to each of the adjacent pairs of windings at the connection therebetween. The windings are polarized so that the current from the source divides equally therein to as well as into the loads, whereby the power from the source is equally divided into the loads with isolation between the loads. Any unbalance is reflected into all of the windings and dissipated in balance resistors shunting each of the adjacent winding pairs.

INVENTORS
JAMES F. JUDSON AND
EUGENE A. PETERSON

BY

ATTORNEY

INVENTORS
JAMES F. JUDSON AND
EUGENE A. PETERSON
BY
M. L. Kaek
ATTORNEY

MULTICOUPLER EMPLOYING A MULTIPLE FILAR-WOUND TRANSFORMER

The present invention relates to power distribution systems and particularly to a multicoupler for dividing power from a source to a multiplicity of loads.

The invention is especially suitable for use in distributing signals received from an antenna to a multiplicity of receivers whereby the received signal power is divided equally among the receivers and the input impedance of the receivers is matched to the output impedance of the antenna or preamplifier which is coupled thereto. The invention however is also applicable to power and signal combining as well as division, not only to antenna systems but also to signal processors, test equipment and the like.

It is important in many applications for signals from a source to be split with equal power to each of a multiplicity of loads; the loads to be maintained in isolation with each other. While power dividers and multicouplers of various types have been proposed for this purpose in the past, they generally have not been sufficiently flexible to meet system requirements. The insertion loss provided by the coupling network may be too high for small signal handling applications. Often times the coupler precludes the establishment of impedance matches between the sources and the loads. If one of the loads is removed the impedance relationships are disturbed and a severe mismatch results. In addition, when broadband operation over the entire impedance matching range is required, circuit complexities must be introduced to solve the problems. Many multicouplers require a separate transformer for each load to obtain requisite isolation among loads; thus increasing the size, weight and cost of the device.

Accordingly, it is an object of the present invention to provide an improved multicoupler wherein the foregoing difficulties are substantially eliminated.

It is a still further object of the present invention to provide an improved multicoupler suitable for dividing or combining power transmitted between a source and a multiplicity of loads or a multiplicity of sources and a single load, such division or combining being accomplished with minimal losses.

It is a still further object of the present invention to provide an improved multicoupler which provides isolation among the loads which are to receive power or to provide isolation among sources, the power from which is to be combined for application to a single load, wherein isolation is not adversely affected if one or more if the multiplicity of sources or loads is removed from the system.

It is a still further object of the present invention to provide an improved multicoupler which provides broadband power division over a significant range of radio frequencies.

It is a still further object of the present invention to provide an improved multicoupler which is adapted to be miniaturized and therefore can be constructed so as to occupy a very small space.

It is a still further object of the present invention to provide an improved multicoupler which is simpler in construction than multicouplers which have been heretofore provided and may therefore be fabricated at low cost.

Briefly described, a multicoupler in accordance with the invention is provided by a network containing a transformer having a multiplicity of windings which are connected in series with each other. Adjacent in series pairs of windings may be oppositely polarized (viz the winding sense is of opposite polarity). The output ports and the input ports of the network are separately connected to the junctions between adjacent pairs of windings. Because of these connections, the windings distribute the driving current equally into themselves. Resistors may be connected in shunt across adjacent output ports. The values of these resistors is such that the removal of one of the multiplicity of loads allows the power delivered to the remaining circuits to stay constant. In order to provide for impedance matching, an input transformer connected at the input port junction of the windings may be provided. The turns ratio of this transformer is related to the number of the multiplicity of circuits which are coupled by the network.

The invention itself, both as to its organization and method of operation, as well as additional objects and advantages thereof will become more readily apparent from a reading of the following description in connection with the accompanying drawings in which.

Figure 1:
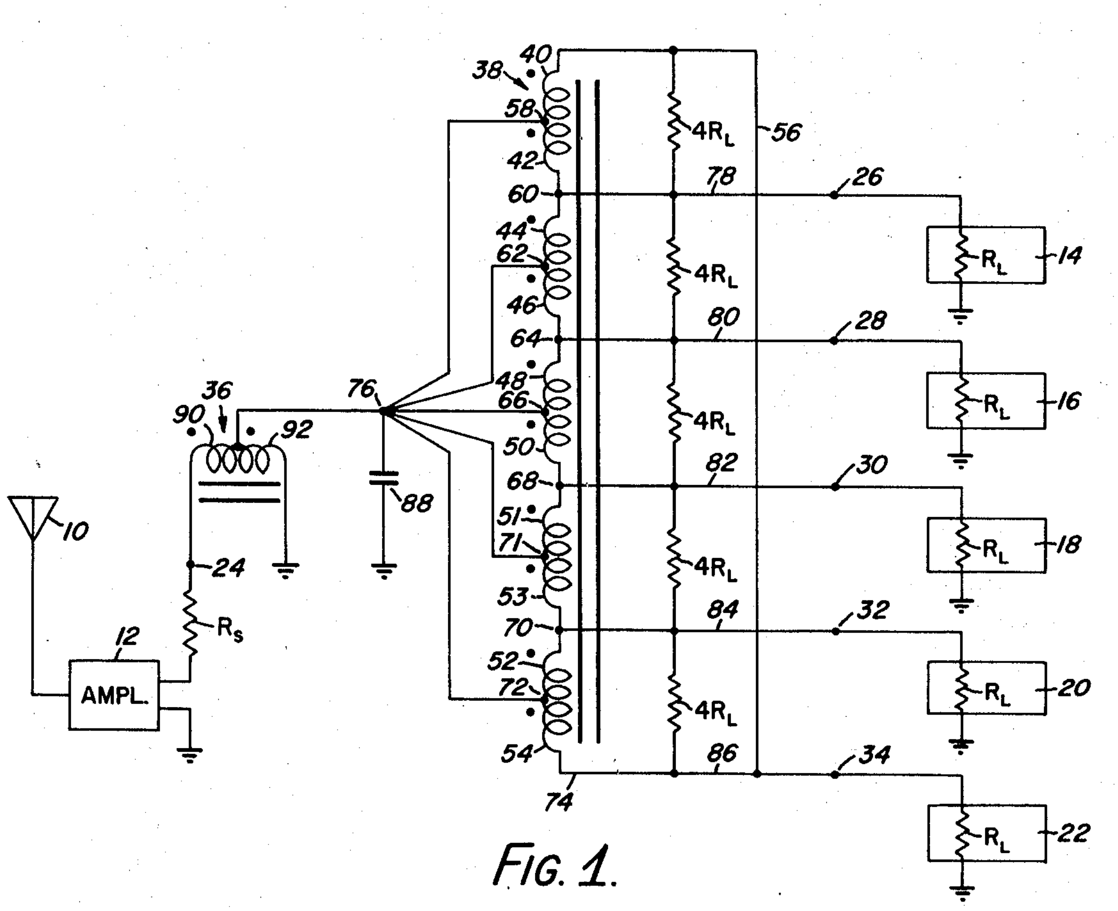
FIG. 1 is a schematic diagram of a multicoupler provided in accordance with the invention.

Referring more particularly to FIG. 1, a multicoupler is depicted for dividing signal power received by an antenna 10 and amplified in a preamplifier 12 into a plurality of loads 14, 16, 18, 20 and 22. These loads may be receivers which, for their operation, require equal signal power be delivered to them. Five loads are shown in FIG. 1. It will be appreciated that any number M of loads may be coupled by means of the multicoupler. Additional windings and shunt resistors need only be provided for the additional loads.

The preamplifier is indicated as having a source resistance $R_s$ which must be matched to the resistance presented by the receivers 14–22, such resistance being depicted as $R_L$. The multicoupler provides such impedance match as is required between an input terminal or port 24 and the output terminals or ports 26, 28, 30, 32 and 34 thereof.

Figure 2:
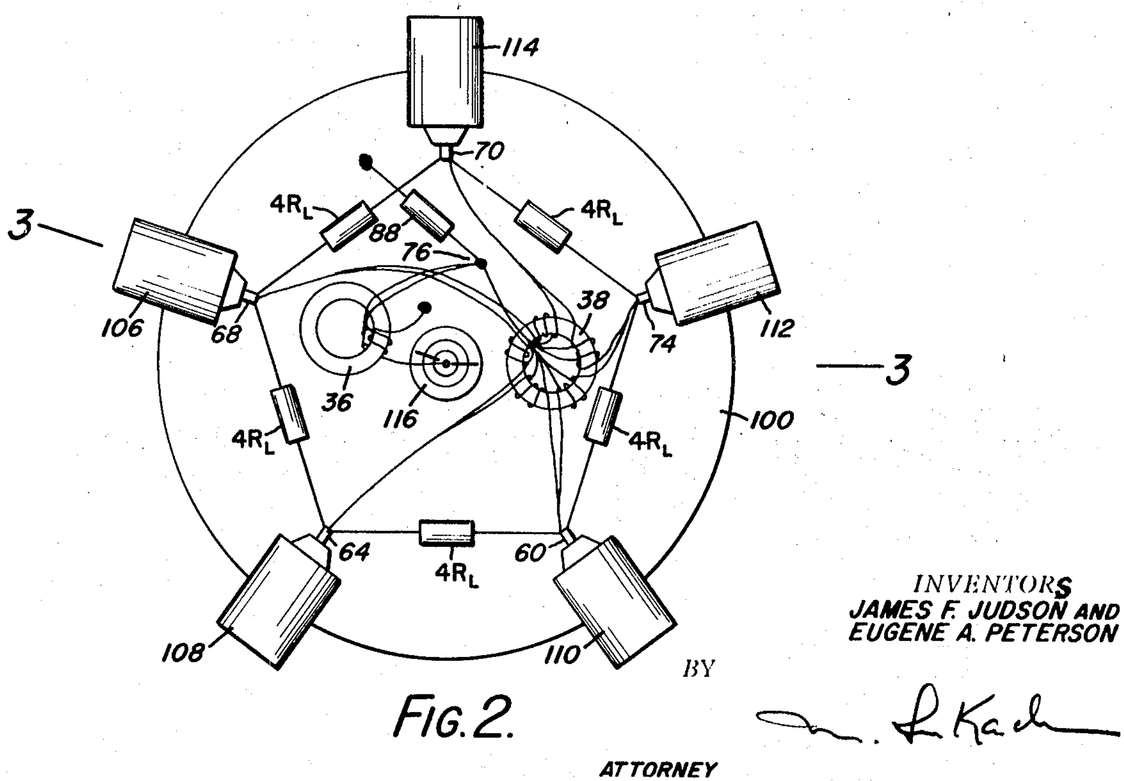
FIG. 2 is a top view of a multicoupler device containing the circuitry schematically shown in FIG. 1.

The multicoupler itself includes two transformers 36 and 38 which will be described more fully hereinafter in connection with FIGS. 2, 2A and 2B. These transformers are broadband transformers having toroidal cores of ferrite material with closely coupled windings thereon. The transformer 38 has 2M filar windings (in the illustrated case M bifilar windings 40, 42, 44, 46, 48, 50, 51, 52, 53 and 54 are used). M is the number of loads. The windings are serially connected in a ring; thus, windings of opposite polarity, as indicated by the dots next to the ends of the windings, are connected to each other. Note that the oppositely polarized ends of the first winding 40 and the last winding 54 are interconnected by a lead 56. It may be desired to connect the ends of the windings of like polarity together. In such case an additional winding, for polarity reversal, will be required when M is odd.

Connections 58, 60, 62, 64, 66, 68, 70, 71, 72 and 74, which are provided between the windings 40–54, provide access for coupling to the inlet port 24 and the outlet ports 26–34. Alternate ones of these connections 58, 62, 66, 71 and 72 are connected in common to a lead 76. Leads 78, 80, 82, 84 and 86 provide connections to the output ports 26, 28, 30, 32 and 34 respectively. Balance resistors having values equal to the 4 $R_L$ are connected in shunt with each bifilar winding (viz between the connections 74 and 60, 60 and 64, 64 and 68, 68 and 70 70 and 74). If any of the loads is removed, say where one of the receivers is not necessary for a particular system application, the 4 $R_L$ resistors dissipate any unbalanced power and permit equal amounts of power to be distributed to the remaining loads. In order to provide for broadband operation, it may be desirable to connect a capacitor 88 between the leads 76 and a point of reference potential, such as ground (the same point of reference potential being provided for the unconnected ends of the load resistors $R_L$).

In order to match the source resistance $R_s$ to all of the load resistors $R_L$ the input transformer 36 is provided with a pair of bifilar windings 90 and 92. The connection between these windings is also connected to the common lead 76. The output of the amplifier 12 and the free end of the winding 92 are connected to ground, such that the source and the transformer 36 are in series with each other. Inasmuch as the transformer 38 provides equal power division, the resistance measured between the lead 76 and ground is equal to $R_L/m$. To match this input impedance to $R_s$, the turns ratio $(N_1+N_2/N_2)$ should be equal to the square root of M, where $N_1$ is the number of turns in the winding 90 and $N_2$ is the number of turns in the winding 92. Accordingly, selection of the proper turns for the windings 90 and 92 provide broadband impedance matching over the frequency range of interest.

Figures 2A, 2B:
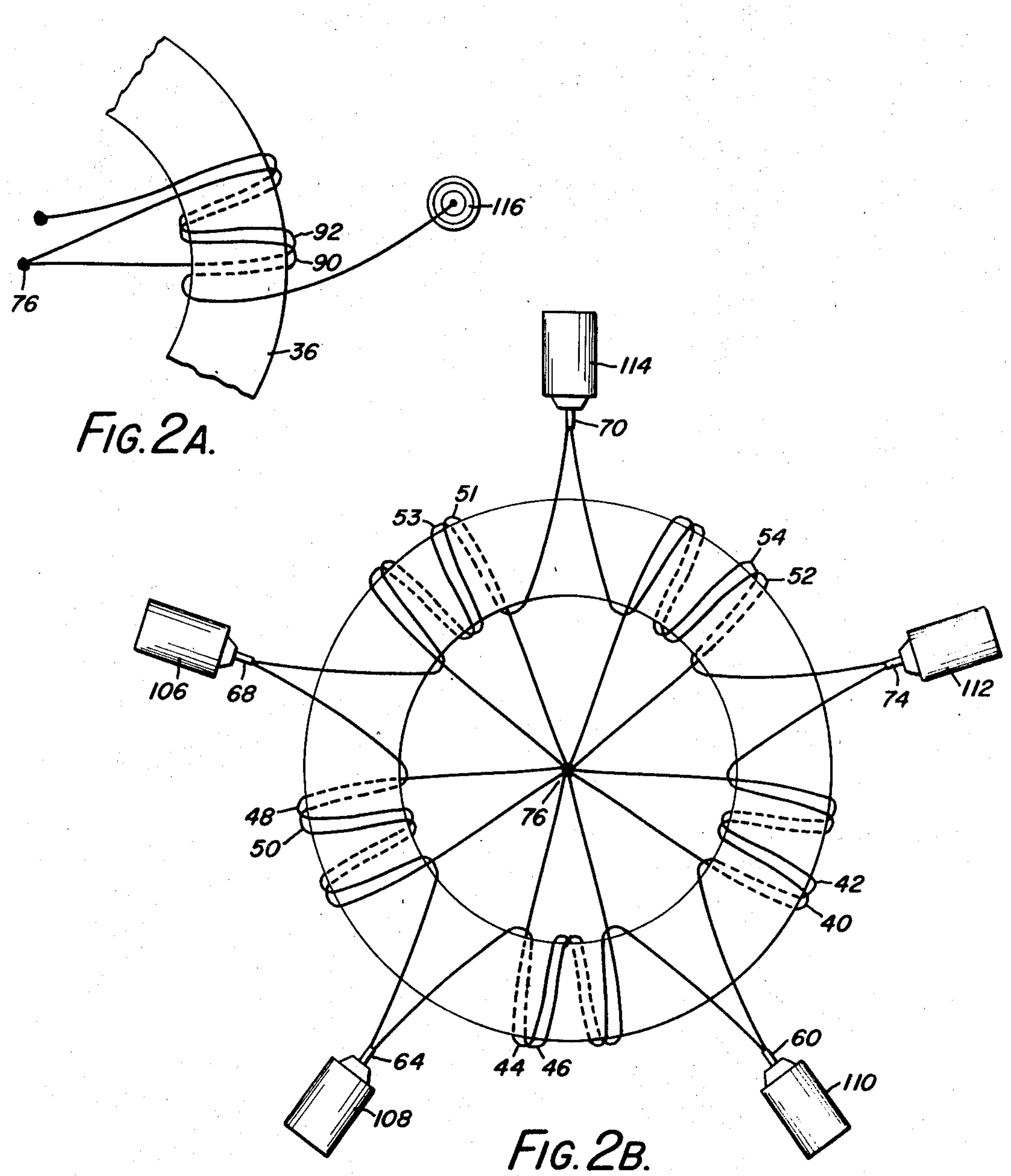
FIGS. 2A and 2B are enlarged fragmentary views of portions of components in the device shown in FIG. 2.
Figure 3:
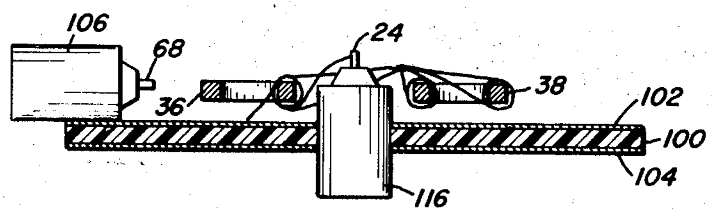
FIG. 3 is a sectional view of the device shown in FIG. 2.

A multicoupler device incorporating the circuit shown in FIG. 1 may be provided in miniaturized form as shown in FIGS. 2, 2A, 2B and 3. The circuit itself is supported on a circuit board 100 having a conductive layer, such as a copper sheet 102 laminated thereto. Another copper sheet 104 may also be provided. A plurality of coaxial connectors 106, 108, 110, 112 and 114 may be mounted, as by soldering, directly on the sheet 102. A connector 116 may be disposed through the center of the board 100 and secured to the conductive layer, as by soldering. The transformers 36 and 38 are mounted on the board and connected to the connectors. The insulated windings on the toroidal cores which provide these transformers provides sufficient strength to maintain the transformers in place. The conductive sheet 102 provides a ground plane (viz forms the points of reference potential or ground) and improves the broadband characteristics of the device. The connector 116 provides the input port 24 and is connected to one end of the winding 90 which may be bifilar wound to provide $(N_1+N_2/N_2)=\sqrt{M}$ with the winding 92 around the portion of the core of the transformer 36. These windings may be twisted together as a twisted pair, however, they are shown separately in FIG. 2 in order to depict their relationship. The interconnected ends of the windings 90 and 92 are shown in FIG. 2A going to the lead 76. This lead may be a common junction point, say to which the windings 40 and 42 of the transformer 38 are brought; this lead going to the center of the toroidal core of the transformer 38. Interconnections, say the interconnections 74 and 60 between adjacent pairs of windings may be made directly at the conductive tips on the connectors, as shown in greater detail in FIG. 2B.

The windings 40, 42, 44, 46, 48, 50, 51, 52, 53 and 54 which form the interconnected pairs, may be twisted pairs which are themselves bifilar wound. If closer coupling is required, all 2M windings 40 to 54 may be twisted and wound together around the core of the transformer 38. It may be desirable to reverse the winding senses on the core 38 to shorten the lead lengths. Also it may be desirable to use an axial core or to split the toroidal core if greater isolation is needed.

From the foregoing description, it will be apparent that there has been provided an improved multicoupler. While the description is of a power divider, it will be appreciated that the invention may be used for combining, as well as dividing, power between a multiplicity of sources and a single load. Other variations and modifications of the herein described device and within the scope of the invention will undoubtedly suggest themselves to those skilled in the art. Accordingly, the foregoing description should be taken merely as illustrative and not in any limiting sense.

What we claim is:

1. A network for coupling a first port to M second ports, wherein M is any integer greater than one, said network comprising a transformer having 2M filar winding connected in series with connections between ends of individual ones of said 2M filar windings, first means for coupling said first port to alternate ones of said connections, and second means for coupling said M ports each to different second alternate ones of said connections, said first and second alternate connections being adjacent to each other.

2. The invention as set forth in claim 1 wherein said connections are between the ends of said windings which are of opposite polarity.

3. The invention as set forth in claim 2 including a signal source and wherein said first coupling means comprises a transformer having a pair of windings connected in series with said source and with a connection between the ends of different ones of said windings which are of opposite polarity, said last named connection being connected to all of said first alternate ones of said connections.

4. The invention as set forth in claim 1 wherein said 2M filar windings are provided by M bifilar windings.

5. The invention as set forth in claim 1 including separate resistors connected between said second alternate ones of said connections.

6. The invention as set forth in claim 1 wherein a source having a resistance $R_s$ is connected to said first port and M loads having resistances $R_L$ are connected to said second ports, said pair of windings having $N_1$ and $N_2$ turns, said source being connected to the free end of said winding of $N_1$ turns, the number of said turns being selected in accordance with the following equation:

$$(N_1+N_2/N_2)=\sqrt{M}$$

7. The invention as set forth in claim 6 wherein the ends of said loads which are opposite to the ends thereof which are connected to said ports are all connected to a point of reference potential and wherein resistors having values of resistance equal to $4R_L$ are separately connected between said second alternate ones of said connections.

8. The invention as set forth in claim 7 including a capacitor connected between said first alternate ones of said connections and said reference potential point.

9. The invention as set forth in claim 8 including a support having a conductive surface upon which at least said transformers and capacitor are mounted, said conductive surface being at said reference potential, and providing said points of connection at said reference potential.